United States Patent
Zhang

(10) Patent No.: US 9,057,901 B2
(45) Date of Patent: Jun. 16, 2015

(54) PLASTIC FRAME, BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventor: Yanxue Zhang, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 200 days.

(21) Appl. No.: 13/704,977

(22) PCT Filed: Dec. 5, 2012

(86) PCT No.: PCT/CN2012/085895
§ 371 (c)(1),
(2) Date: Dec. 17, 2012

(87) PCT Pub. No.: WO2014/082323
PCT Pub. Date: Jun. 5, 2014

(65) Prior Publication Data
US 2014/0146266 A1    May 29, 2014

(30) Foreign Application Priority Data
Nov. 29, 2012  (CN) .......................... 2012 1 0499335

(51) Int. Cl.
*G02F 1/1333*    (2006.01)

(52) U.S. Cl.
CPC .................... *G02F 1/133308* (2013.01); *G02F 2001/133317* (2013.01)

(58) Field of Classification Search
CPC .......... G02F 1/33382; G02F 1/133308; G02F 1/133385; G02F 2001/133317
USPC ........................................................... 349/58
See application file for complete search history.

(56) References Cited

U.S. PATENT DOCUMENTS

| | | | |
|---|---|---|---|
| 8,842,234 B2* | 9/2014 | Yu | 349/58 |
| 2010/0165239 A1* | 7/2010 | Lee et al. | 349/58 |
| 2011/0110069 A1* | 5/2011 | Cho et al. | 361/829 |
| 2012/0162880 A1* | 6/2012 | Yoon et al. | 361/679.01 |
| 2012/0236541 A1* | 9/2012 | Chen | 362/97.2 |

* cited by examiner

Primary Examiner — Nathanael R Briggs
(74) Attorney, Agent, or Firm — Andrew C. Cheng

(57) ABSTRACT

The present invention discloses a plastic frame, a backlight module and a liquid crystal display device. The plastic frame comprising a support portion for supporting the liquid crystal panel, and having a first side surface disposed adjacent to the liquid crystal panel and provided with multiple first concave structures; and a second side surface disposed away from the liquid crystal panel and opposite to the first side surface. Through the above way, the present invention can reduce the heat transmitted to the liquid crystal panel and reduce the risk of display problem of the liquid crystal panel produced by over temperature so as to improve the display quality of the liquid crystal display device.

18 Claims, 5 Drawing Sheets

PLASTIC FRAME, BACKLIGHT MODULE AND LIQUID CRYSTAL DISPLAY DEVICE

BACKGROUND OF THE INVENTION

1. Field of the Invention

The present invention relates to the field of display technology, and more particularly to a plastic frame, a backlight module and a liquid crystal display device.

2. Description of Related Art

Because the liquid crystal display device using direct-light type backlight module is thicker, the liquid crystal display device generally uses the side light type backlight module. For the side-light type backlight module, the generated heat is large at the light incident side of the light source. In order to avoid the heat affect the display quality of the liquid crystal panel as well as to improve the life of the device, it must take some heat dissipation designs for distributing the generated heat from the light source right away. FIG. 1 is a schematic view of a thermal design of the liquid crystal display device in the prior art.

With reference to FIG. 1, the liquid crystal display device 100 includes a liquid crystal panel 110 and a plastic frame 130 of a backlight module 120. Wherein the plastic frame 130, a first side surface 131 disposed adjacent to the liquid crystal panel 110, and a second side surface 132 disposed away from the liquid crystal panel 110 and disposed oppositely to the first side surface 131 are all smooth planar structures. The liquid crystal display device 100 mainly uses the plastic frame 130 for insulating the heat generated from the light source at the light incident side in order to reduce the heat sustained by the liquid crystal panel 110.

However, in the liquid crystal display device with Gate. On Array (GOA), in the thermal design shown in FIG. 1, the liquid crystal panel not only sustains the heat transmitted from the light source, but also sustains the heat generated when it is displaying. Thereby, it easily leads to high temperature problem of the liquid crystal panel so as to induce display problems in order to reduce the display quality of the liquid crystal display device.

In summary, it requires to provide a plastic frame, a backlight module and a liquid crystal display device in order to solve the above problems.

SUMMARY OF THE INVENTION

The technical problem solved by the present invention is to provide a plastic frame, a backlight module, and a liquid crystal device to reduce the heat transmitted to the liquid crystal panel and reduce the risk of the display problem of the liquid crystal panel produced by over temperature so as to improve the display quality of the liquid crystal display device.

In order to solve the above-mentioned technical problem, a technical solution provided by the present invention is: a plastic frame comprising: a support portion for supporting a liquid crystal panel and having: a first side surface disposed adjacent to the liquid crystal panel and provided with multiple first concave structures; a second side surface disposed away from the liquid crystal panel and opposite to the first side surface; a thermal conductive member disposed on the second side surface; and a buffer member disposed between the support portion and the liquid crystal panel and having a third side surface disposed adjacent to the liquid crystal panel and a fourth side surface disposed away from the liquid crystal panel and opposite to the third side surface, and the fourth side surface provides with multiple second concave structures.

Wherein, the multiple first concave structures are spaced at intervals by rows and columns on the first side surface, and the number of each row of the multiple first concave structures is at least two, and the number of each column of the multiple first concave structures is at least two.

Wherein, the thermal conductive member is a stripe structure and is disposed on the second side surface by attaching.

Wherein, the multiple second concave structures are spaced at intervals by rows and columns on the fourth side surface, and the number of each row of the multiple second concave structures is at least two, and the number of each column of the multiple second concave structures is at least two.

Wherein, the first side surface further provides with a recess, and the multiple first concave structures are disposed at a bottom of the recess.

Wherein, the buffer member is disposed within the recess.

In order to solve the above-mentioned technical problem, another technical solution provided by the present invention is: a backlight module comprising: a light guide plate; an optical film; and a plastic frame comprising a support portion for supporting a liquid crystal panel, the support portion pressing and holding the light guide plate and the optical film and having a first side surface disposed adjacent to the liquid crystal panel and provided with multiple first concave structures; and a second side surface disposed away from the liquid crystal panel and opposite to the first side surface.

Wherein, the multiple first concave structures are spaced at intervals by rows and columns on the first side surface, and the number of each row of the multiple first concave structures is at least two, and the number of each column of the multiple first concave structures is at least two.

Wherein, the plastic frame further comprises a thermal conductive member disposed on the second side surface.

Wherein, the thermal conductive member is a stripe structure and is disposed on the second side surface by attaching.

Wherein, the plastic frame further comprises a buffer member disposed between the support portion and the liquid crystal panel, and having a third side surface disposed adjacent to the liquid crystal panel and a fourth side surface disposed away from the liquid crystal panel and opposite to the third side surface, and the fourth side surface provides with multiple second concave structures.

Wherein, the first side surface further provides with a recess, and the multiple first concave structures are disposed at a bottom of the recess.

Wherein, the buffer member is disposed within the recess.

In order to solve the above-mentioned technical problem, another technical solution provided by the present invention is: a liquid crystal display device comprising: a liquid crystal panel; and a plastic frame comprising a support portion for supporting the liquid crystal panel and having a first side surface disposed adjacent to the liquid crystal panel and provided with multiple first concave structures; and a second side surface disposed away from the liquid crystal panel and opposite to the first side surface.

Wherein, the multiple first concave structures are spaced at intervals by rows and columns on the first side surface, and the number of each row of the multiple first concave structures is at least two, and the number of each column of the multiple first concave structures is at least two.

Wherein, the plastic frame farther comprises a thermal conductive member disposed on the second side surface.

Wherein, the thermal conductive member is a stripe structure and is disposed on the second side surface by attaching.

Wherein, the plastic frame further comprises a buffer member disposed between the support portion and the liquid crystal panel, and having a third side surface disposed adjacent to the liquid crystal panel and a fourth side surface disposed away from the liquid crystal panel and opposite to the third side surface, and the fourth side surface provides with multiple second concave structures.

Wherein, the first side surface further provides with a recess, and the multiple first concave structures are disposed at a bottom of the recess.

Wherein, the buffer member is disposed within the recess.

The beneficial effect of the present invention is: through the support portion of the plastic frame and the multiple first concave structures disposed on the first side surface disposed adjacent to the liquid crystal panel; using the air within the multiple first concave structures to achieve the insulation of the heat generated by the light source in order to reduce the heat transmitted to the liquid crystal panel. Therefore, it reduces the risk of the display problem of the liquid crystal panel produced by over temperature so as to improve the display quality of the liquid crystal display device.

DETAILED DESCRIPTION OF THE PREFERRED EMBODIMENT

The following content combines with the drawings and the embodiment for describing the present invention in detail.

Figure 1:
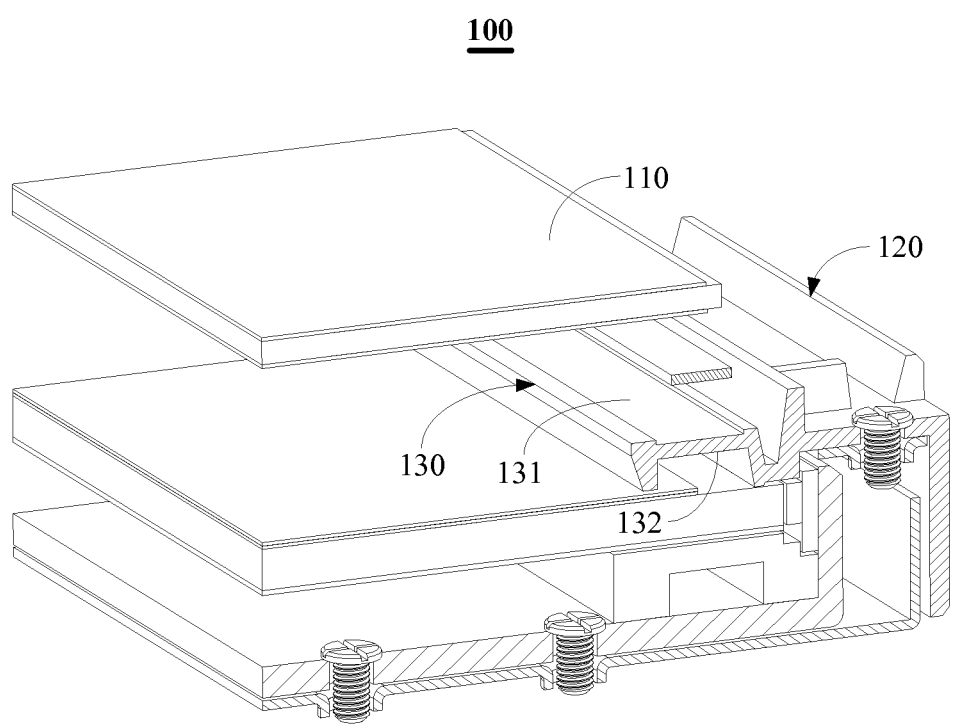
FIG. 1 is a schematic diagram of the liquid crystal display device having a thermal design in the prior art.
Figure 2:
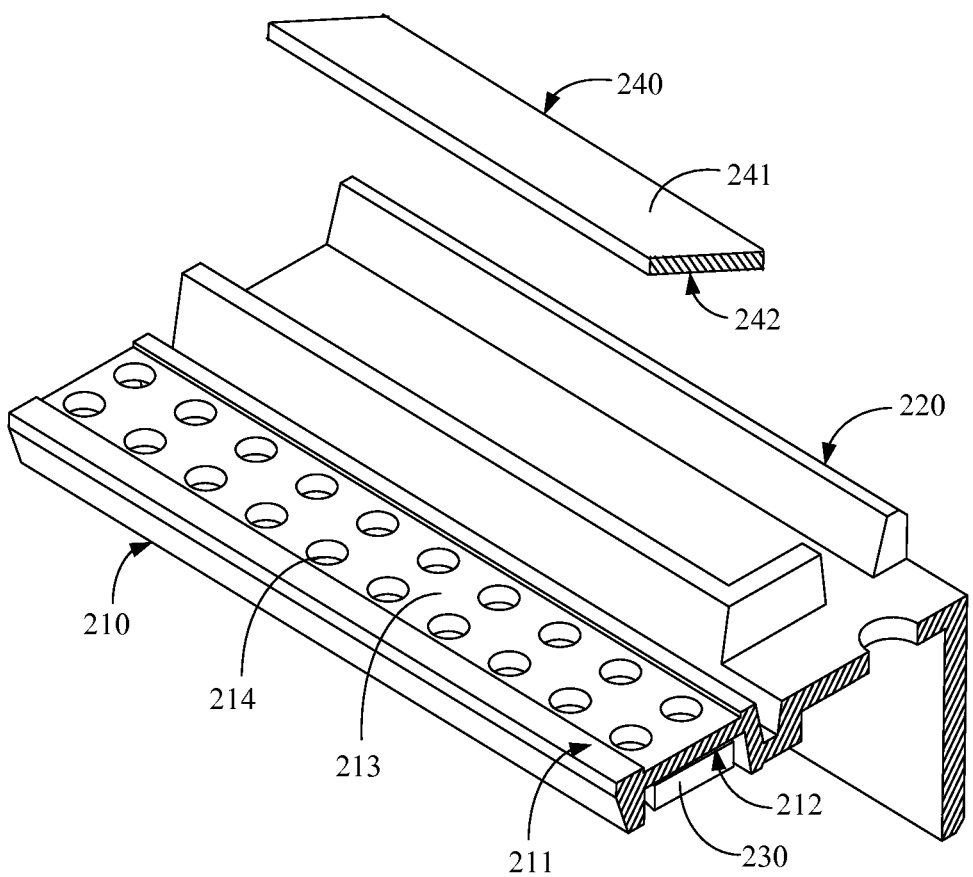
FIG. 2 is a schematic diagram of an embodiment of a plastic frame in the present invention.

FIG. 2 is a schematic diagram of an embodiment of a plastic frame in the present invention. As shown in FIG. 2, the plastic frame 200 includes a support portion 210, a mounting portion 220, a thermal conductive member 230 and a buffer member 240.

In the present embodiment, the support portion 210 includes a first side surface 211 and a second side surface 212. The first side surface 211 and the second side surface 212 are disposed oppositely. The first side surface 211 provides with a recess 213, and a bottom of the recess 213 is provided with multiple first concave structures 214. Wherein, the multiple first concave structures 214 are spaced at intervals by rows and columns at the bottom of the recess 213. The number of each row of the multiple first concave structures 214 is at least two, and the number or each column of the multiple first concave structures 214 is at least two. The present invention is not limited as shown in FIG. 2.

It should be noted that, in another embodiment, on the first side surface 211 of the support portion 210, it may not be provided with the recess, that is, a planar structure. The multiple first concave structures 214 are disposed directly on the first side surface 211.

In the present embodiment, the multiple first concave structures 214 is for storing air so that the plastic frame 200 can uses the stored air to achieve the insulation of the heat generated by the light source.

The thermal conductive member 230 is a stripe structure, and it can be disposed on the second side surface 212 by attaching or other means. Wherein, the thermal conductive member 230 is made of a polymer thermally conductive synthetic material, a heat conductive metal or other material of good thermal conductivity. In another embodiment, the thermal conductive member 230 may be disposed on the second side surface 212 by other means. In the present embodiment, the thermal conductive member 230 can prevent the heat generated by the light source from gathering at the light incident side, to achieve the greatest homogenization of the overall temperature of the plastic frame 200.

Figure 3:
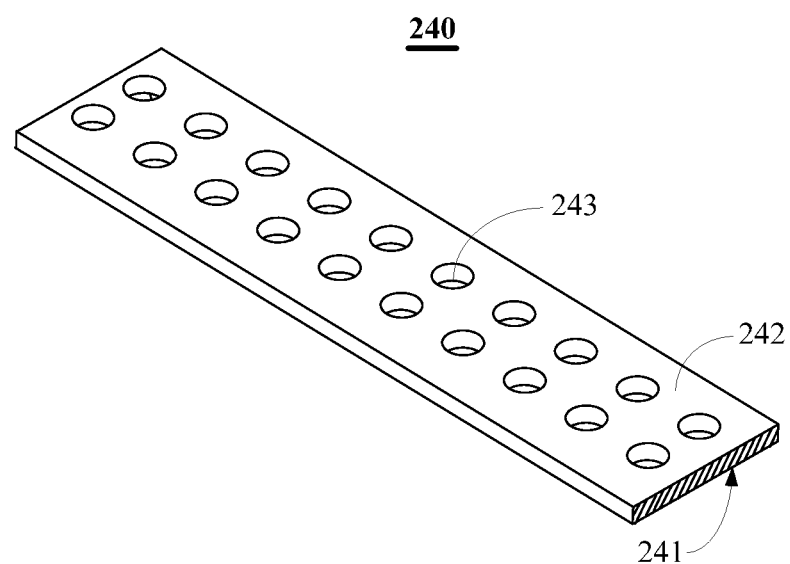
FIG. 3 is a schematic diagram of a buffer member shown in FIG. 2.

FIG. 3 is a schematic diagram of a buffer member shown in FIG. 2. With reference to FIG. 2 and FIG. 3, the buffer member 240 is a stripe structure and is disposed in the recess 213 of the first side surface 211 of the support portion 210. The buffer member 240 includes a third side surface 241 and a fourth side surface 242. The fourth side surface 242 is disposed oppositely to the third side surface 241 and is provided with multiple second concave structures 243.

Wherein, the multiple second concave structures 243 are spaced at intervals by rows and columns on the fourth side surface 242. The number of each row or the multiple second concave structures 243 is at least two, and the number of each row of the multiple second concave structures 243 is at least two.

In the present embodiment, the buffer member 240 is a plastic strip or material members having good heat-insulating properties and certain flexibility. The buffer member 240 protects the liquid crystal panel and achieves the insulation of the heat generated by the light source at the same time through the air within the multiple second concave structures 243. It should be noted that, in another embodiment, the buffer member 240 may not be provided in the recess 213, and just provided on the first side surface 211 of the support portion 210 of plastic frame 200. It only requires achieving the insulation function of the heat.

Figure 4:
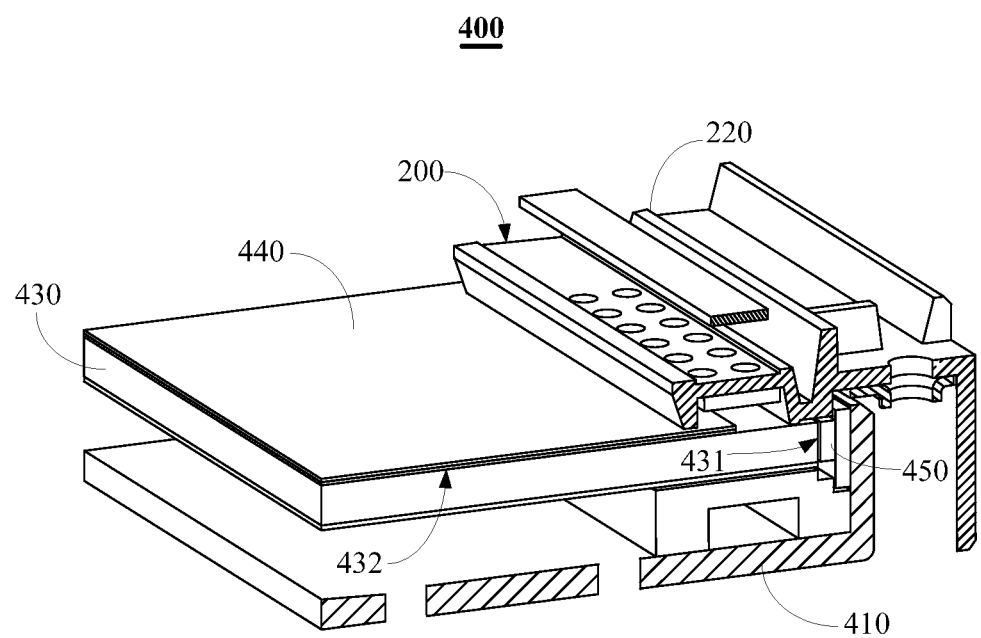
FIG. 4 is a schematic diagram of an embodiment of the plastic frame of a backlight module shown in FIG. 2.

FIG. 4 is a schematic diagram of an embodiment of the plastic frame 200 of a backlight module 400 shown in FIG. 2. As shown in FIG. 4, the backlight module 400 comprises: a backplane 410, the plastic frame 200, a light guide plate 430, an optical film 440 and a light source 450. The light guide plate 430, the light source 450 and the optical film 440 are disposed within a space defined by the backplane 410 and the plastic frame 200.

In the present embodiment, the light guide plate 430 includes a light incident surface 431 and a light emitting surface 432. An included angle between the light incident surface 431 and the light emitting surface 432 is 90°. The light source 450 is disposed adjacent to the light incident surface 431, and the optical film 440 is disposed adjacent to the light emitting surface 432. The second side surface 212 of the support portion 210 of the plastic frame 200 (shown in FIG. 2) is disposed toward the light guide plate 430. The support portion 210 presses and holds the light guide plate 430 and the optical film 440. The mounting portion 220 of the plastic frame 200 is fixed to the backplane 410 by screws. In another embodiment, they may be fixed together by rivets or weld.

In the present embodiment, since it uses the structure as the plastic frame 200 shown in FIG. 2, the plastic frame 200 can avoid the temperature concentration at the light incident side because of the heat generated by the light source in order to achieve the homogenization of the overall temperature of the plastic frame. At the same time, the air within the concave structures of the plastic frame 200 can achieve insulating the heat generated by the light source 450 in order to reduce the heat transmitted out and from the plastic frame 200.

Figure 5:
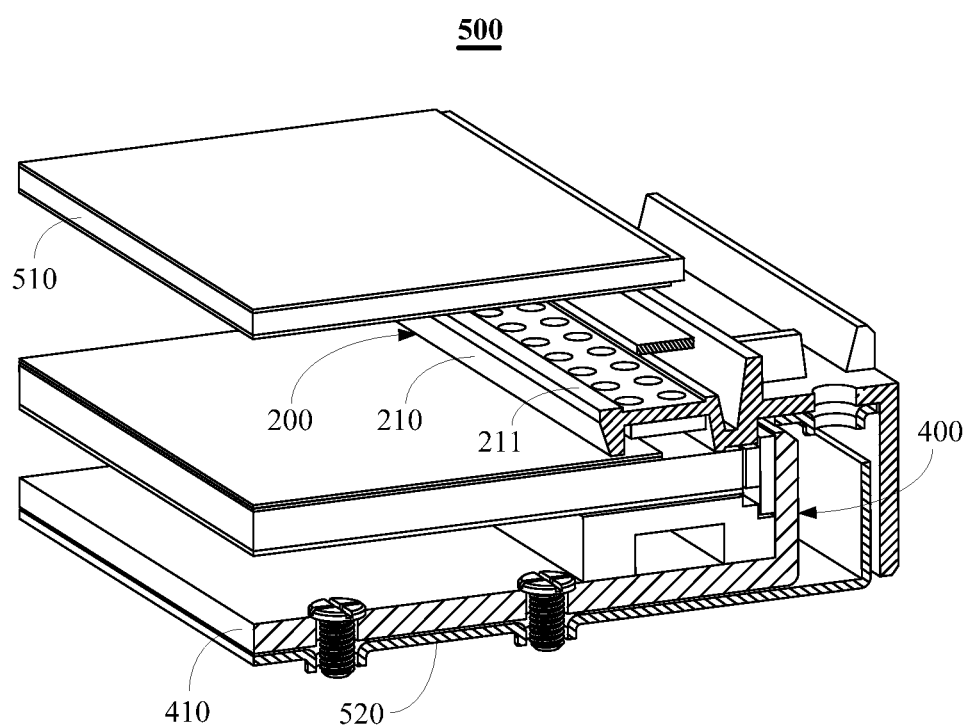
FIG. 5 is a schematic diagram of an embodiment of the backlight module of a liquid crystal display device shown in FIG. 4.

FIG. 5 is a schematic diagram of an embodiment of the backlight module 400 of a liquid crystal display device 500 shown in FIG. 4. As shown FIG. 5, the liquid crystal display device 500 includes: a liquid crystal panel 510, a backlight module 400, and an outer frame 520.

Wherein, the liquid crystal panel 510 is adjacent to the first side surface 211 of the support portion 210 of the plastic frame 200. The outer frame 520 and the backplane 410 of the backlight module 400 are fixed together through screws.

Through the foregoing, since it uses the structure as the plastic frame 200 shown in FIG. 2, the plastic frame 200 can avoid the temperature concentration at the light incident side because of the heat generated by the light source in order to achieve the homogenization of the overall temperature of the plastic frame. At the same time, the air within the concave structures of the plastic frame 200 can achieve insulation of the heat generated by the light source 450 in order to reduce the heat transmitted to the liquid crystal panel 510 and reduce the risk of the display problem of the liquid crystal panel 510 produced by over temperature so as to improve the display quality of the liquid crystal display device 500.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A plastic frame comprising:
a support portion for supporting a liquid crystal panel and having:
a first side surface disposed adjacent to and below the liquid crystal panel and provided with multiple first concave structures, wherein the multiple first concave structures are for storing air so that the plastic frame can use the stored air to achieve an insulation of a heat generated by a light source; and
a second side surface disposed away from the liquid crystal panel and opposite to the first side surface;
a thermal conductive member disposed on the second side surface and right below the multiple first concave structures; and
a buffer member disposed between the support portion and the liquid crystal panel and having a third side surface disposed adjacent to the liquid crystal panel and a fourth side surface disposed away from the liquid crystal panel and opposite to the third side surface, and the fourth side surface provides with multiple second concave structures for storing air, wherein, the fourth side surface faces toward the first side surface of the support portion.

2. The plastic frame according to claim 1, wherein, the multiple first concave structures are spaced at intervals by rows and columns on the first side surface, and the number of each row of the multiple first concave structures is at least two, and the number of each column of the multiple first concave structures is at least two.

3. The plastic frame according to claim 1, wherein, the thermal conductive member is a stripe structure and is disposed on the second side surface by attaching.

4. The plastic frame according to claim 1, wherein, the multiple second concave structures are spaced at intervals by rows and columns on the fourth side surface, and the number of each row of the multiple second concave structures is at least two, and the number of each column of the multiple second concave structures is at least two.

5. The plastic frame according to claim 1, wherein, the first side surface further provides with a recess, and the multiple first concave structures are disposed at a bottom of the recess.

6. The plastic frame according to claim 4, wherein, the buffer member is disposed within the recess.

7. A backlight module comprising:
a light guide plate;
an optical film; and
a plastic frame comprising
a support portion for supporting a liquid crystal panel, the support portion pressing and holding the light guide plate and the optical film, and having
a first side surface disposed adjacent to and below the liquid crystal panel and provided with multiple first concave structures, wherein the multiple first concave structures are for storing air so that the plastic frame can use the stored air to achieve an insulation of a heat generated by a light source; and
a second side surface disposed away from the liquid crystal panel and opposite to the first side surface and disposed above the light guide plate;
a thermal conductive member disposed on the second side surface and disposed between the second side surface and the light guide plate and disposed right below the multiple first concave structures.

8. The backlight module according to claim 7, wherein, the multiple first concave structures are spaced at intervals by rows and columns on the first side surface, and the number of each row of the multiple first concave structures is at least two, and the number of each column of the multiple first concave structures is at least two.

9. The backlight module according to claim 7, wherein, the thermal conductive member is a stripe structure and is disposed on the second side surface by attaching.

10. The backlight module according to claim 7, wherein, the plastic frame further comprises a buffer member disposed between the support portion and the liquid crystal panel, and having a third side surface disposed adjacent to the liquid crystal panel and a fourth side surface disposed away from the liquid crystal panel and opposite to the third side surface, and the fourth side surface provides with multiple second concave structures for storing air, wherein, the fourth side surface faces toward the first side surface of the support portion.

11. The backlight module according to claim 7, wherein, the first side surface further provides with a recess, and the multiple first concave structures are disposed at a bottom of the recess.

12. The backlight module according to claim 11, wherein, a buffer member is disposed within the recess.

13. A liquid crystal display device comprising:
a liquid crystal panel;
a light guide plate; and
a plastic frame comprising:
a support portion for supporting the liquid crystal panel and having
a first side surface disposed adjacent to and below the liquid crystal panel and provided with multiple first concave structures, wherein the multiple first concave structures are for storing air so that the plastic frame can use the stored air to achieve an insulation of a heat generated by a light source; and
a second side surface disposed away from the liquid crystal panel and opposite to the first side surface and disposed above the light guide plate; and
a thermal conductive member disposed on the second side surface and disposed between the second side surface and the light guide plate and disposed right below the multiple first concave structures.

14. The liquid crystal display device according to claim 13, wherein, the multiple first concave structures are spaced at intervals by rows and columns on the first side surface, and the number of each row of the multiple first concave structures is at least two, and the number of each column of the multiple first concave structures is at least two.

15. The liquid crystal display device according to claim 13, wherein, the thermal conductive member is a stripe structure and is disposed on the second side surface by attaching.

16. The liquid crystal display device according to claim 13, wherein, the plastic frame further comprises a buffer member disposed between the support portion and the liquid crystal panel, and having a third side surface disposed adjacent to the liquid crystal panel and a fourth side surface disposed away from the liquid crystal panel and opposite to the third side surface, and the fourth side surface provides with multiple second concave structures for storing air, wherein, the fourth side surface faces toward the first side surface of the support portion.

17. The liquid crystal display device according to claim 13, wherein, the first side surface further provides with a recess, and the multiple first concave structures are disposed at a bottom of the recess.

18. The liquid crystal display device according to claim 17, wherein, a buffer member is disposed within the recess.

\* \* \* \* \*